(12) United States Patent
Skoglund

(10) Patent No.: US 7,487,665 B2
(45) Date of Patent: Feb. 10, 2009

(54) METHOD FOR MONITORING THE STAY TIME IN A RESTRICTED CONDUIT

(75) Inventor: Tomas Skoglund, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 130 days.

(21) Appl. No.: 10/554,506

(22) PCT Filed: Dec. 22, 2003

(86) PCT No.: PCT/SE03/02064

§ 371 (c)(1),
(2), (4) Date: Aug. 16, 2006

(87) PCT Pub. No.: WO2004/097346

PCT Pub. Date: Nov. 11, 2004

(65) Prior Publication Data

US 2007/0033988 A1    Feb. 15, 2007

(30) Foreign Application Priority Data

Apr. 30, 2003  (SE) .................................... 0301261

(51) Int. Cl.
*G01M 19/00* (2006.01)
*G01F 1/708* (2006.01)
*G01N 25/00* (2006.01)

(52) U.S. Cl. ...................... 73/49.5; 73/204.11; 374/45

(58) Field of Classification Search .................. 73/49.5, 73/861, 861.01, 204.11; 374/45
See application file for complete search history.

(56) References Cited

U.S. PATENT DOCUMENTS 3,967,500 A    7/1976   Forster
4,774,453 A    9/1988   Dechene et al.

FOREIGN PATENT DOCUMENTS

| DE | 100 50 262 A1 | 5/2002 |
| GB | 1 439 324 | 6/1976 |
| GB | 2 057 141 A | 3/1981 |
| WO | 01/98738 A2 | 12/2001 |

*Primary Examiner*—Daniel S Larkin
(74) *Attorney, Agent, or Firm*—Buchanan, Ingersoll & Rooney PC

(57) ABSTRACT

The disclosure relates to a method of monitoring the stay time in a restricted conduit, such as a holding tube in a heat treatment plant. A first measurement registration x of a chemical or physical magnitude, such as the temperature, takes place in the beginning of the restricted conduit. A second measurement registration y of the same chemical or physical magnitude, i.e. the temperature, takes place in the end of the restricted conduit. X and y measure natural temperature variations in the product for which the intention is to control the stay time. The stay time is determined by the time lag t at the best co-variation between x and y. By filtering the measurement registration for y, it is possible to refine the measurement method and compensate for dispersion in the product.

13 Claims, 4 Drawing Sheets

METHOD FOR MONITORING THE STAY TIME IN A RESTRICTED CONDUIT

This application is based on and claims priority to Swedish Application No. 0301261-4 filed Apr. 30, 2003 and International Application No. PCT/SE2003/002064 filed on Dec. 22, 2003 designating the U.S., the entire contents of both of which are hereby incorporated by reference.

TECHNICAL FIELD

The present invention relates to a method for monitoring the stay time in a restricted conduit where a first measurement registration takes place at the beginning of the restricted conduit and a second measurement registration takes place at the end of the restricted conduit.

BACKGROUND ART

In the heat treatment of pumpable liquid food products, the product is heated to a predetermined temperature. The temperature depends on the type of process that is intended, such as, for example, pasteurisation or sterilisation. When the product has reached the desired temperature, it is to be kept at this temperature for a given, predetermined interval of time. By combining temperature with stay time for different products, there will be obtained products with different shelf lives, such as sterile products that can be delivered at room temperature and such products as are to be delivered in an unbroken refrigeration chain.

The heat treatment may be put into effect indirectly or directly. In indirect heat treatment, the heating takes place in some form of heat exchanger, for example a plate heat exchanger or a tube heat exchanger. In the direct methods, steam is supplied direct to the product. Examples of direct methods are injection heating and infusion heating.

In order to be able to maintain the temperature which the product obtains as a result of the heat treatment during a given predetermined interval of time, use is made of a holding tube which is placed in immediate association with the heat treatment equipment. The holding tube is normally designed as a pipe loop, or alternatively a straight pipe length, or as a combination of both. The length of the pipe or the pipe loop corresponds to the time which for a given product at a given calculated capacity stays in the holding tube. It is important that the stay time be exact, since too short a stay time does not give the desired treatment of the product, with the result that a product is obtained which does not have the intended shelf life and which may rapidly become a downright health hazard. Excessively long stay times can destroy the product which, as a result of excessive thermal shock, suffers from changes in flavour, aroma or nutrient content.

Normally, temperature indicators are provided in holding tubes, the indicators being placed ahead of and after the holding tube, where the temperature indicator placed ahead of the holding tube is included in the control of the regulator loop for the heat treatment equipment. The temperature indicator placed after the holding tube is used to monitor that the product was at the correct temperature in the holding tube. On the other hand, at present there are few reliable methods of checking that the stay time is that intended.

The traditional methods that consist of the conductivity method and the dye method cannot be employed during production. The product must then be replaced by water and salt or a dye, respectively, is added to the water. Thereafter, the time it takes for the saline solution or the dyed water, respectively, to pass through the holding tube is measured. The saline water is registered by conductivity measurements and the dyed water is registered by means of observation. Both of these methods suffer from numerous drawbacks and the error sources are obvious.

Patent Specification WO 01/98738 discloses a method of monitoring the stay time in a restricted pipe length by inducing a temperature change in the product. This temperature change is registered by one temperature gauge ahead of the holding tube and one temperature gauge after the holding tube. The time which elapses between these registrations constitutes the stay time. The drawbacks inherent in this method are that it is necessary to induce a disruption which is sufficiently great for it to be able to be measured in a single measurement. There is always a danger in disrupting a process and a wealth of knowledge is required to be able to carry this out reliably.

OBJECTS OF THE INVENTION

One object of the present invention is to realise a method for monitoring and monitoring the stay time in which use is made of natural temperature variations in the product so that it is not necessary to intervene and disrupt the process.

A further object of the present invention is that the method may be employed continuously or intermittently so as to obtain a more reliable monitoring of the stay time than in prior art methods.

SOLUTION

These and other objects have been attained according to the present invention in that the method of the type described by way of introduction has been given the characterising features that the first measurement registration x measures a chemical or physical magnitude and the second measurement registration y measures the same chemical or physical magnitude, and where a best co-variation between x and y is sought, and that a time lag $\tau$ at the best co-variation gives the stay time.

Preferred embodiments of the present invention have further been given the characterising features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings. In the accompanying Drawings.

DESCRIPTION OF PREFERRED EMBODIMENT

Figure 1:
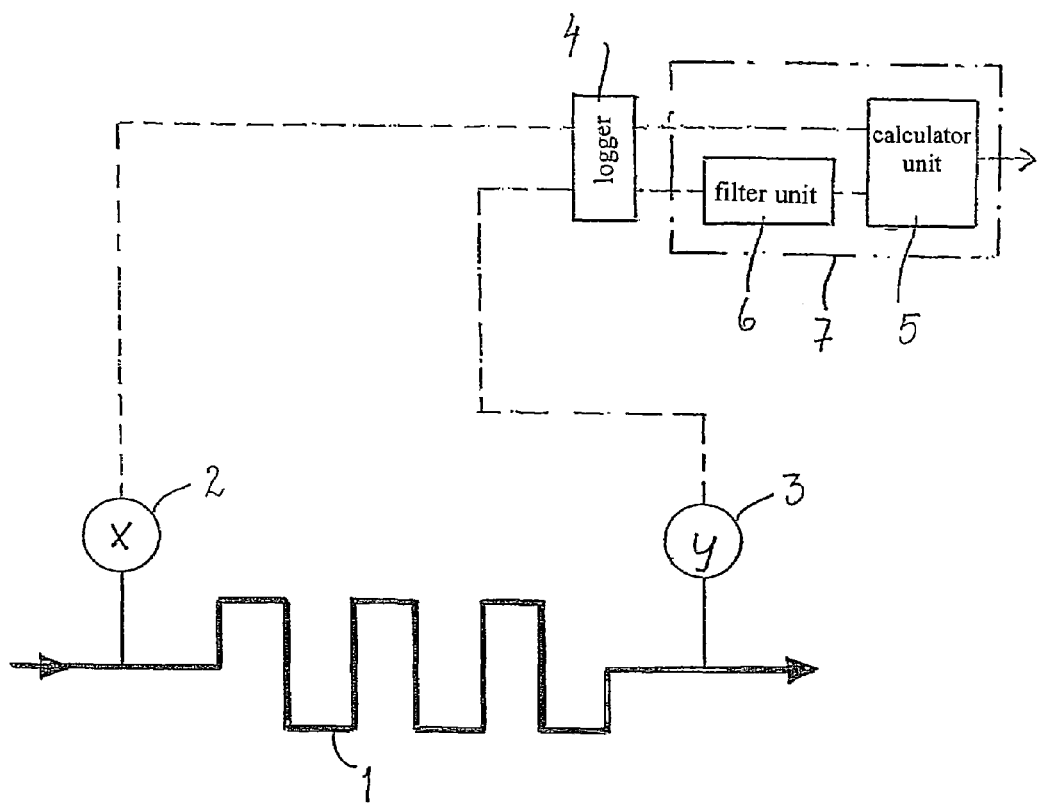
FIG. 1 shows a holding tube with equipment for carrying out the method.

The method according to the present invention is employed to monitor the stay time in a restricted conduit. The restricted conduit may consist of a so-called holding tube 1 as shown in FIG. 1, i.e. a restricted pipe length or pipe loop in which a product which has been heat treated is to stay during a given, predetermined interval of time. The holding tube 1 is normally placed in immediate association with heat treatment equipment which may be a heat exchanger, or alternatively an injector or an infusor (not shown on the Drawings).

At the beginning of the restricted conduit, the holding tube 1, there is disposed a first temperature gauge 2, for example a thermoelement or a resistor element or some other form of sensor which displays sufficiently rapid registration. At the end of the holding tube 1, there is disposed a second temperature gauge 3, for example a thermoelement or a resistor element or some other form of sensor which displays sufficiently rapid registration. The two temperature gauges 2, 3 should be of the same type or have the same performance.

If the intention is for a continuous monitoring of the stay time, it is possible to utilise the stationary temperature gauges 2, 3 that are normally provided in the beginning and in the end of a holding tube 1. These temperature gauges 2, 3 are normally employed to check that the temperature reaches the predetermined level. If the intention is for a more temporary checking of the stay time, use may be made of supplementary temperature gauges 2, 3 in order not to unnecessarily disrupt the process.

The temperature gauges 2, 3 are suitably disposed so that they measure the temperature centrally in the pipe so as to obtain the highest level of accuracy. The temperature measurements are registered and processed in computer controlled process monitoring equipment. If the monitoring equipment does not have sufficient capacity, it may possibly need to be supplemented with a computer. As shown in FIG. 1, the measured values enter into a so-called logger 4. A logger 4 registers, with a certain preselected interval, the measurement values from the two temperature gauges 2, 3 and stores them. The measurement values are then used for calculations in a calculator unit 5 in a computer 7. Alternatively, the logger 4 may constitute a part of a computer 7.

Other physical or chemical magnitudes, such as conductivity, may be measured as an alternative to the temperature. However, the commonest procedure is temperature measurement.

Figure 2:
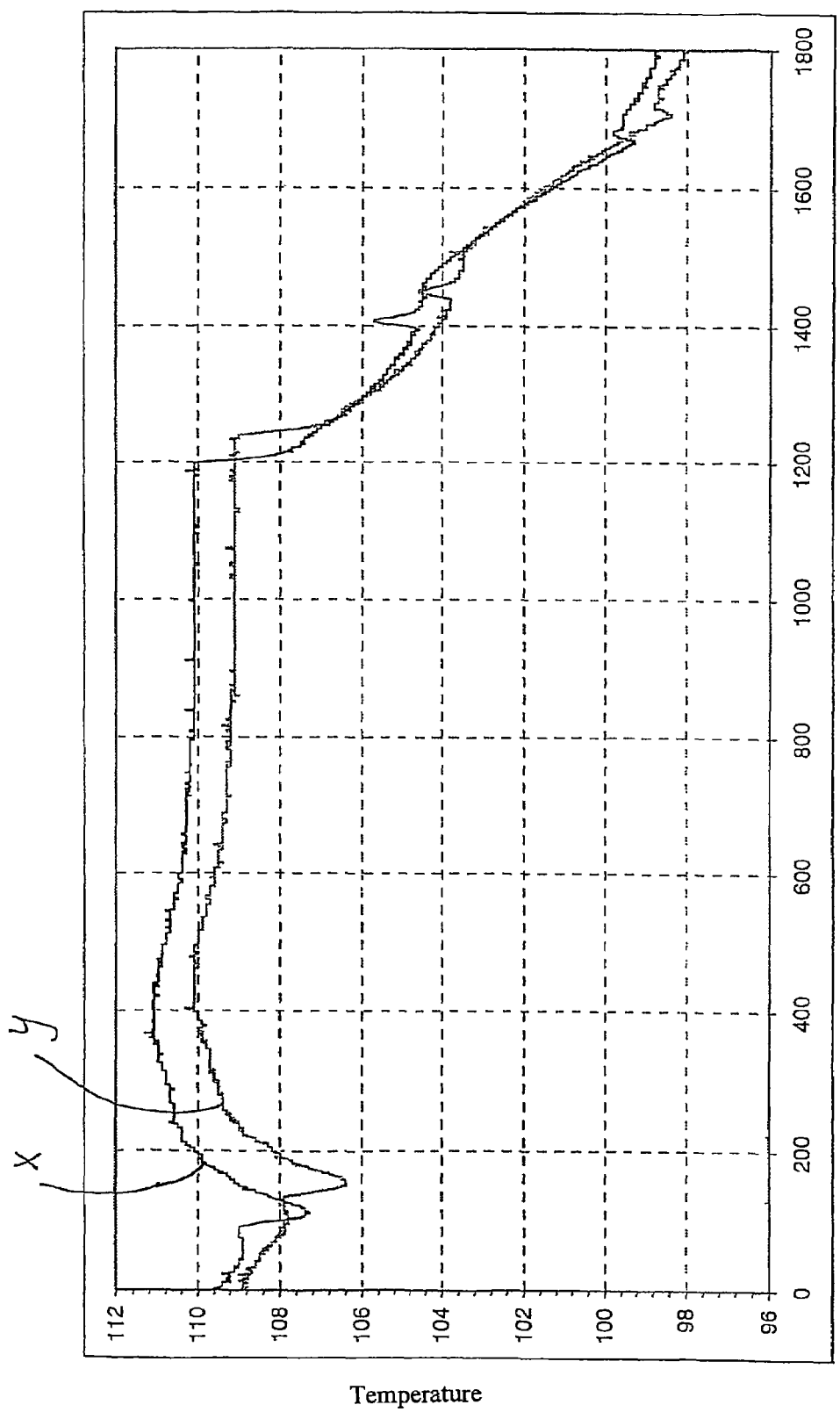
FIG. 2 is a diagram showing continuous measurement registrations of x and y.

In a product that has been heat treated and is thereafter to pass through a holding tube 1, there are minor natural temperature variations or changes, like a natural noise. If a first measurement registration measures a physical or chemical magnitude x, a second measurement registration measures the same physical or chemical magnitude y. FIG. 2 is a diagram showing continuous measurement registrations x and y. The vertical axis of the diagram shows the measurement result and the horizontal axis shows the time.

In the preferred embodiment, the first measurement registration consists of the first temperature gauge 2 and the second measurement registration consists of the second temperature gauge 3. The physical or chemical unit which is measured is the temperature. The diagram shows how the temperature quite naturally varies with time by minor changes. Naturally, disruptions may also be generated in the product, but it is an advantage if it is possible to avoid disrupting the process.

The two curves for x and y are offset in relation to one another. By calculating the best co-variations for the two curves, a time lag $\tau$ will be obtained between the two curves which directly gives the stay time in the restricted conduit. The co-variation may be described as constituting the relationship between the variations in the measurements. The relationship between x and y is calculated in relation to the time lag and the best co-variation is to be found where the relationship is strongest. The co-variation calculations are carried out in the calculator unit 5 of the computer 7.

The best co-variation may be calculated in two ways. In the preferred embodiment, a correlation calculation $\rho$ of x and y is made in accordance with the following formula: $\rho_{x,y}=\text{cov}(x,y)/\delta_x\delta_y$, where cov is a co-variance function of a measurement series of a sufficient number of the variables x and y, i.e. in the preferred embodiment the temperatures. $\delta$ is the standard deviation for x and y, respectively.

Figure 3:
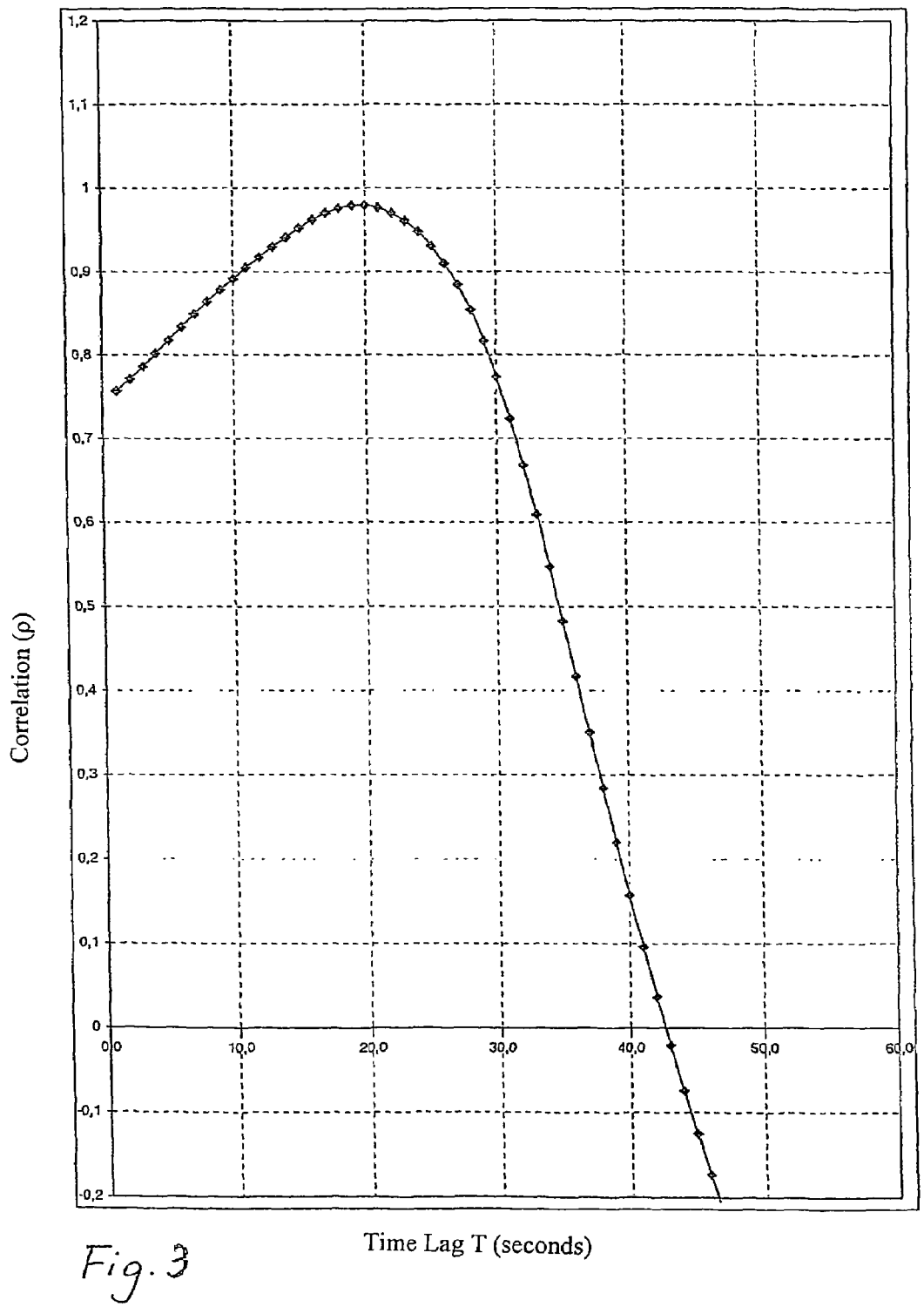
FIG. 3 is a diagram showing correlation calculations for a series of measurement values.

A correlation function, such as that which is shown in FIG. 3, is a curve showing the correlation $\rho$ as a function of the time lag $\tau$. The correlation function is calculated according to the formula: $\rho(\tau)=\text{cov}(x, y(\tau)\delta_x\delta_y$, where $y(\tau)$ is a measurement series of y with the time lag $\tau$ in relation to x. The vertical axis of the diagram indicates the correlation $\rho$ and the horizontal axis indicates the time lag $\tau$ in seconds. In the diagram, a clear maximum is seen which lies close to a correlation of 1. Those maxima that can be employed so as to give a good monitoring of the stay time may lie close to 1. The maxima of the diagram occur at a time lag $\tau$ which is 20 seconds. The stay time for the product for which the measurements and calculations have been made is thus 20 seconds.

In the preferred embodiment, there will thus be obtained a stay time in a restricted conduit which is equal to the time lag $\tau$ so that the correlation function $\rho(\tau)$ is maximised.

The best co-variation can alternatively be calculated with the least square root method, in order to find the smallest deviation between x and y. This calculation is made according to the formula: $k(\tau)=\Sigma(x(t)-y(t+\tau))2/\delta_x\delta_y$, where k is the smallest square total as a function of the time lag $\tau$. $\delta$ is the standard deviation for x and y, respectively. In the alternative embodiment, there will thus be obtained a stay time in a restricted conduit which is equal to the time lag $\tau$ so that the smallest square root sum $k(\tau)$ is minimised.

The above method may be employed for continuous measurements and calculations and where the control equipment of the process can immediately issue an alert if a desired stay time is not attained. The above method may also be employed for quality control in an installation where a limited measurement series of the temperature measurements x and y is made in order to ensure that the stay time is that intended.

Figure 4A:
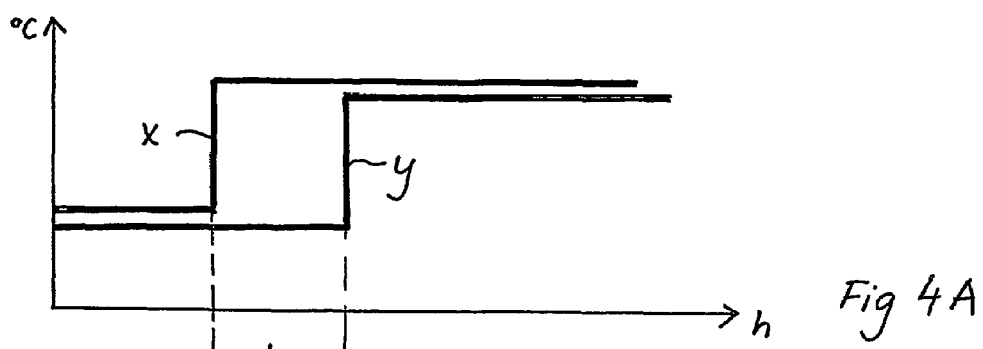
FIG. 4A is a diagram showing measurements under ideal conditions.
Figure 4B:
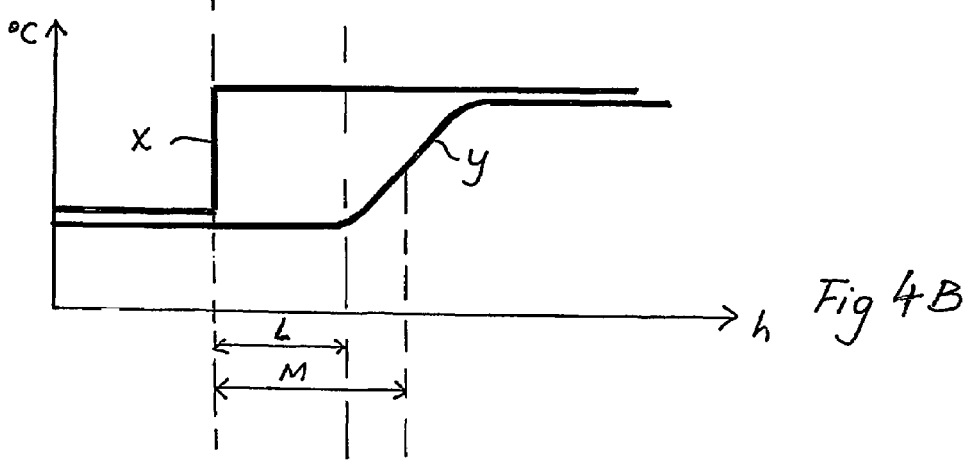
FIG. 4B is a diagram showing measurements with dispersion.
Figure 4C:
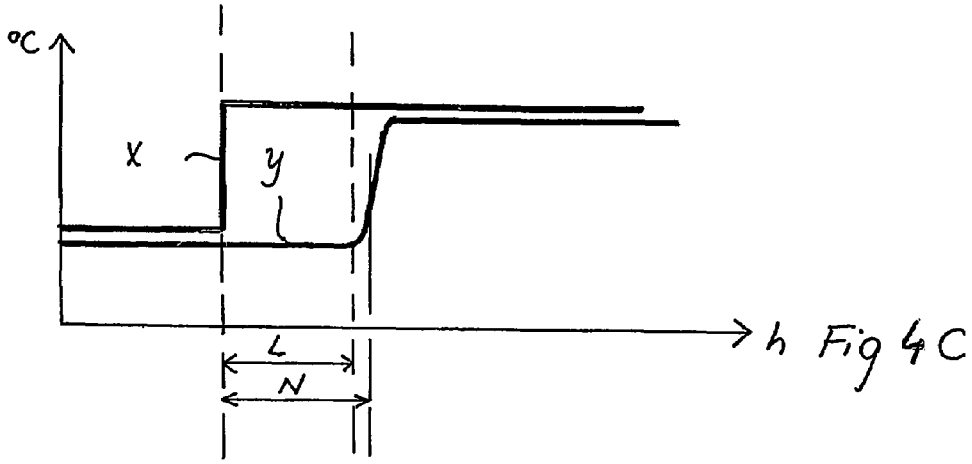
FIG. 4C is a diagram showing measurements with filter.

With a view to further refining the measurement method and by such means obtaining more exact measurement values, it is possible to compensate for the dispersion that occurs in the product to which the measurements refer. Dispersion entails that the natural variation, for example of the temperature, strives for a certain equalisation because of turbulence, flow profile and diffusion of different types. FIGS. 4A-C show different measurements of x and y which, in these diagrams, are stated as being temperature. Other physical or chemical magnitudes can also be measured.

In FIG. 4A, x and y are measured in ideal conditions and no dispersion occurs. Thus, the distance L indicates the stay time. In FIG. 4B, x and y have been measured in natural conditions, i.e. dispersion occurs and the curve for y has a more extended appearance. Since the best co-variation will be a mean value, the distance M constitutes the calculated stay time. The distance. L constitutes the stay time for those parts of the product which stay in the holding tube for the shortest time. Thus, L is the desired stay time.

By filtering the measurement and thereby recreating the natural disruption without dispersion, a diagram will be obtained in accordance with FIG. 4C. The distance L indicates the correct stay time, while the distance N constitutes the calculated mean stay time. Since N lies considerably closer to the ideal value L than does M, there will be obtained by filtration a more exact value for the stay time than arrived at by calculations without filtering. By filtering, x is reconstructed from the measurement for y and the dispersion is thereby discounted. An average stay time (=measurement volume/volume flow) can then also be calculated. The difference between L and N, i.e. how well x has been reconstructed from y, depends on how exact the filter is, the better the filter, the smaller the difference. A filter unit 6 in the computer 7 is shown in FIG. 1, and while the measurement values x from the first temperature gauge 2 go direct to the calculator unit 5, the measurement values y from the second temperature gauge 3 pass through the filter unit 6.

As will have been apparent from the above description, the present invention realises a method for monitoring the stay time in a restricted conduit where it is possible to carry out the monitoring continuously or intermittently. The method can be carried into effect on product, which gives a more reliable result than prior art methods. The method according to the present invention employs existing variations of, for example, the temperature in the product, for which reason it is not necessary to induce disruptions, thus affording a more reliable method.

What is claimed is:

1. A method for monitoring the stay time in a restricted conduit comprising performing a first measurement registration at a beginning of the restricted conduit and a second measurement registration at an end of the restricted conduit, wherein the first measurement registration x measures a chemical or physical magnitude and the second measurement registration y measures the same chemical or physical magnitude, and where a best co-variation between x and y is sought, and that a time lag $\tau$ at the best co-variation gives the stay time, and further wherein the restricted conduit comprises a holding tube, the first measurement registration x is carried out with a first temperature gauge, and the second measurement registration y is carried out with a second temperature gauge.

2. The method as claimed in claim 1, wherein the chemical or physical magnitude is temperature.

3. The method as claimed in claim 2, wherein the measurement registration for y is filtered.

4. The method as claimed in claim 1, wherein the best co-variation is a correlation $\rho$ which is maximised at the time lag $\tau$.

5. The method as claimed in claim 4, wherein the measurement registration for y is filtered.

6. The method as claimed in claim 1, wherein the best co-variation is a smallest square root sum k which is minimised at the time lag $\tau$.

7. The method as claimed in claim 6, wherein the measurement registration for y is filtered.

8. The method as claimed in claim 1, wherein the measurement registration for y is filtered.

9. A method for monitoring the stay time in a restricted conduit comprising performing a first measurement registration at a beginning of the restricted conduit and a second measurement registration at an end of the restricted conduit, wherein the first measurement registration x measures a chemical or physical magnitude and the second measurement registration y measures the same chemical or physical magnitude, and where a best co-variation between x and y is sought, and that a time lag $\tau$ at the best co-variation gives the stay time, and further wherein the best co-variation is either of a correlation $\rho$ which is maximised at the time lag $\tau$ or a smallest square root sum k which is minimised at the time lag $\tau$.

10. The method as claimed in claim 9, wherein the chemical or physical magnitude is conductivity.

11. The method as claimed in claim 10, wherein the measurement registration for y is filtered.

12. The method as claimed in claim 11, wherein the restricted conduit comprises a holding tube; the first measurement registration x is carried out with a first temperature gauge; and the second measurement registration y is carried out with a second temperature gauge.

13. The method as claimed in claim 9, wherein the restricted conduit comprises a holding tube; and the first measurement registration x is carried out with a first temperature gauge; and the second measurement registration y is carried out with a second temperature gauge.

* * * * *